(12) United States Patent
Guthery et al.

(10) Patent No.: US 6,963,740 B1
(45) Date of Patent: Nov. 8, 2005

(54) SECURE ENTERPRISE COMMUNICATION SYSTEM UTILIZING ENTERPRISE-SPECIFIC SECURITY/TRUST TOKEN-ENABLED WIRELESS COMMUNICATION DEVICES

(75) Inventors: Scott B. Guthery, Newton, MA (US); Mary J. Cronin, Newton, MA (US)

(73) Assignee: Mobile-Mind, Inc., Watertown, MA (US)

( * ) Notice: Subject to any disclaimer, the term of this patent is extended or adjusted under 35 U.S.C. 154(b) by 370 days.

(21) Appl. No.: 10/209,175

(22) Filed: Jul. 31, 2002

Related U.S. Application Data

(60) Provisional application No. 60/308,925, filed on Jul. 31, 2001.

(51) Int. Cl.[7] .............................................. H04M 1/66
(52) U.S. Cl. .................... 455/410; 455/411; 455/432.1; 455/432.2; 455/557; 455/558; 379/189; 379/395.52; 380/229; 380/247; 380/250
(58) Field of Search .......................... 455/432.1, 432.3, 455/407, 556.1, 556.2, 557, 558, 559, 410, 455/411, 432.2; 379/189, 395.52; 380/229, 380/247, 250

(56) References Cited

U.S. PATENT DOCUMENTS

| | | | |
|---|---|---|---|
| 5,557,679 A * | 9/1996 | Julin et al. .................... 380/249 |
| 6,188,882 B1 * | 2/2001 | Tarkiainen et al. ........ 455/404.1 |
| 6,549,773 B1 * | 4/2003 | Linden et al. ............. 455/426.1 |
| 6,556,820 B1 * | 4/2003 | Le et al. ...................... 455/411 |
| 6,768,903 B2 * | 7/2004 | Fauconnier et al. ......... 455/403 |
| 6,795,701 B1 * | 9/2004 | Baker et al. ................. 455/411 |
| 2001/0005670 A1 * | 6/2001 | Lahtinen ..................... 455/2.01 |
| 2002/0197991 A1 * | 12/2002 | Anvekar et al. ............. 455/432 |
| 2003/0078036 A1 * | 4/2003 | Chang et al. ................ 455/419 |
| 2003/0078072 A1 * | 4/2003 | Serceki et al. .............. 455/557 |
| 2003/0204574 A1 * | 10/2003 | Kupershmidt ............... 709/220 |
| 2004/0078571 A1 * | 4/2004 | Haverinen ................... 713/168 |

FOREIGN PATENT DOCUMENTS

WO    WO 02/054195 A2    7/2002

\* cited by examiner

*Primary Examiner*—Sonny Trinh
*Assistant Examiner*—Khai Nguyen
(74) *Attorney, Agent, or Firm*—Gesmer Updegrove LLP

(57) ABSTRACT

An enterprise communications system for implementing, accessing, using, and managing enterprise-specific resources includes one or more Mandate clients, each Mandate client including a wireless communication device and an enterprise-specific identity module installed in such wireless communication device, a digital mobile communications network operative to provide a wireless communications link to each Mandate client, a Mandate server interfaced with the digital mobile communications network and interconnected to the enterprise-specific resources, each enterprise-specific identity module having stored therein a unique authentication key and cryptographic algorithms, the unique authentication key and the cryptographic algorithms of each enterprise-specific identity module being available to the digital mobile communications network and the Mandate server, wherein each Mandate client, the digital mobile communications network and the Mandate server utilize the unique authentication key and the cryptographic algorithms to provide authenticated and encrypted communications therebetween for secure implementation, access, use, and management of enterprise-specific resources by each Mandate client.

12 Claims, 2 Drawing Sheets

SECURE ENTERPRISE COMMUNICATION SYSTEM UTILIZING ENTERPRISE-SPECIFIC SECURITY/TRUST TOKEN-ENABLED WIRELESS COMMUNICATION DEVICES

FIELD OF THE INVENTION

The present invention relates generally to secure mobile digital communication networks, and more particularly, is directed to an enterprise communications system for securely implementing, accessing, using, and managing enterprise-specific resources on enterprise-specific security/trust token-enabled wireless communication devices utilizing an existing digital mobile communications network.

BACKGROUND OF THE INVENTION

Enterprises today conduct a significant amount of business that involves the use and/or dissemination of proprietary and/or confidential business applications, information and data. Such proprietary and/or confidential business applications, information, and data has been generated and developed by the enterprise at a substantial cost in funding and resources, and, accordingly, represents an extremely valuable asset of the enterprise. Of paramount concern to such enterprises is maintaining the security and integrity of such proprietary and/or confidential business applications, information and data, particularly in those instances where such proprietary and/or confidential business applications, information and/or data must be used outside the confines of the enterprise. Generally such proprietary and/or confidential business applications, information and data is stored within the enterprise in electronic format in enterprise storage, a centralized repository that provides for common management and security, as well as data sharing functions, for stored proprietary and/or confidential business applications, information and data. Access to such proprietary and/or confidential business applications, information, and data is generally via an enterprise server using landline networks.

With the increasing complexity and pace of business transactions in the world today, it is of paramount importance that enterprises provide prompt and easy access to its proprietary and/or confidential business applications, information, and data while concomitantly maintaining the security and integrity of such proprietary and/or confidential business applications, information, and data. While internal access to such proprietary and/or confidential business applications, information, and data in enterprise storage is generally a relatively convenient, painless, and secure process, the same cannot be said for remote access to proprietary and/or confidential business applications, information, and data in enterprise storage.

Prior to even initiating a remote communication session to access enterprise storage via a landline network, one must have access to a computer system such as a desktop computer or a laptop, which are not always readily available. The computer system must include the necessary hardware to connect such computer system to a landline system.

Presuming these hardware requirements are met, it will be appreciated that remote communication sessions with enterprise storage via landline networks are not subject to a high degree of security. Enterprises generally do not employ encryption/decryption schemes to protect proprietary and/or confidential business applications, information, and data that is transmitted over landline networks due to the high investment and operating costs and inconvenience in establishing and employing such schemes. Instead, enterprises tend to rely on the inherent difficulties involved in intercepting unencrypted proprietary and/or confidential business applications, information, and data transmitted over landline networks. Thus, remote access to proprietary and/or confidential business applications, information, and data poses a real and substantial risk to the enterprise. The foregoing problems are aggravated when one considers remote wireless communications with enterprise storage.

The risk of interception of proprietary and/or confidential business applications, information, and data transmitted via wireless communications is considerably greater for wireless communications than for communications via landline networks. For example, the transmitting frequencies used by wireless communication networks are generally public domain information. The basic equipment needed to intercept wireless communications is readily available on the open market and is relatively easy to implement.

A need exists to provide an enterprise communications system that allows the enterprise securely implement, access, use, and manage enterprise-specific proprietary and/or confidential business applications, information, and data for remote transactions. Such an enterprise communication system should provide a high degree of security for proprietary and/or confidential business applications, information, and data communicated outside of the enterprise while concomitantly not require a significant expenditure of funds and resources by the enterprise to implement such security schemes. Such a system should be relatively easy to implement, and should facilitate the confident use of wireless communications to conduct enterprise business transactions.

Digital mobile communication networks that provide secure wireless communication channels for voice and data transmissions are becoming available to and used by a larger percentage of the general population for personal communications. For example, the Global System for Mobile Communication (GSM) network is far and away the largest existing secure digital mobile communications network in the world (in North America the GSM network is identified as the GMS 1900 or PCS 1900 network since the North American network operates at 1.9 GHz). Current estimates suggest that there are in the neighborhood of 700 million GSM network users worldwide. And, at a present growth rate of approximately 10 million new users per month, the GSM network (and its technical evolutions such as 3GPP, UMTS, and IMT-2000) is likely to remain the predominant secure digital mobile communications network into the future. Secure digital mobile communication networks such as the GSM network are operative to regularly authenticate network users during communication sessions to ensure that such users are authorized to use the network and to provide true point-to-point encryption for wireless communications.

The general architecture of a generic GSM network is illustrated in FIG. 1 and is representative of such digital mobile communication networks. The GSM network, which provides telephony, bearer services, e.g., transmission and reception of data, Group 3 facsimile, and supplementary services to GSM users, comprises three functional entities, whose functions and interfaces are defined by ETSI specifications: (1) mobile stations; (2) base station subsystem; and (3) the network subsystem.

Each mobile station consists of a customized wireless communication device (hereinafter the "GSM terminal") and an installed SIM (Subscriber Identity Module) card wherein the interfaces between the GSM terminal and the SIM card are standardized. The GSM terminal is physically customized, i.e., configured, for installation of any SIM card. The GSM terminal is also structurally and functionally configured, e.g., includes a user interface (key pad, display screen) and menu structure for user inputs, to interact with the SIM card (in fact, the GSM terminal is inoperative without a SIM card installed therein). Each GSM terminal is uniquely identified by serial number, the IMEI (International Mobile Equipment Identity).

The SIM card is a specific instance of a smart card or security/trust token for secure wireless communication networks, i.e., in this instance for the GSM network. Other representative examples of smart cards for secure wireless communication networks include the Universal Identity Module (UIM), the Removable User Identity Module (R-UIM), and the UMTS Subscriber Identity Module (USIM). The SIM represents the subscription contract between a specific subscriber (network user) and the GSM network operator, i.e., providing the means for authenticating the subscriber for network access and identifying GSM network services to which the subscriber is entitled, i.e., the SIM card is the subscriber's identity in the context of the GSM network. The SIM card is portable to any GSM terminal, thereby providing the subscriber with an unprecedented degree of personal mobility.

The SIM card is in fact a small computer, containing a standardized operating system (JavaCard™ is implemented in the SIM card; Smart Card for Windows and Multos™ are other standardized operating systems for smart cards) and system files, RAM and flash memory (for storage of data and applications), a microprocessor, and typically a cryptographic co-processor. The GSM network operator controls the distribution and the stored content, e.g., data, applications, of the SIM card. Stored on SIM cards configured for GSM networks are subscription and security-related data, e.g., a subscriber number (International Mobile Subscriber Identity (IMSI)) that uniquely identifies the subscriber, a network operator-assigned subscriber-specific call number (MSISDN), i.e., the subscriber's 'phone number' in the GSM network, the subscriber key and cryptographic algorithms for authentication of the subscriber and encryption of subscriber communications (specified by the GSM network operator), and subscriber personal data, e.g., the subscriber's password or personal identity number (PIN) for accessing the SIM card, personal telephone directory, call charging information, a log of recently-dialed numbers, short text messages (for use with SMS (Short Message Service)), and a personalized subscriber services portfolio, i.e., applications.

Also embedded in the SIM card is a SIM Application Toolkit (STK). The STK provides the functional capability, inter alia, to allow the subscriber to access and use embedded applications via the user interface of the GSM terminal, and to modify the menu structure of the GSM terminal in conjunction with the use of such applications. The STK also allows the GSM network operator to download new data and/or applications to the SIM card to implement new services for the subscriber.

The SIM card includes built-in security functions that preclude electronic access to the content stored in the SIM card, e.g., the content cannot be extracted from the SIM card or reverse engineered. These security functions will also erase/delete SIM card content in response to physical tampering detected utilizing conventional technologies such as micro-probing, ultra-violet light examination, and voltage, temperature, and clock manipulation.

The base station subsystem functions as the interface between mobile stations and the network subsystem and consists one or more base station controllers, each base station controller managing several base transceiver stations. Each base station controller manages the control functions and physical links between its base stations and the network subsystem. Each base transceiver station provides the wireless communication interface, i.e., radio link, for mobile stations within its coverage area (cell).

The network subsystem manages the mobility operations such as registration, authentication, location updating, handovers, and call routing for the GSM network and its subscribers, e.g., by means of the HLR (Home Location Register), VLR (Visitor Location Register), AUC (Authentication Center), and EIR (Equipment Identity Register). The network subsystem also provides the interface between mobile stations and fixed landline networks. More specifically, in the network subsystem the MSC (Mobile Switching Center) functions as a network-switching node, routing GSM wireless communications traffic to/from fixed landline networks such as PSTN (Public Switched Telephone Networks), ISDN (Integrated Services Digital Networks), PSPDN (Packet Switched Public Data Networks), and/or CSPDN Circuit Switched Public Data Networks). It will be appreciated that wireless traffic routed over fixed landline networks is not in an encrypted format since most landline network terminals do not avail themselves of any encryption/decryption technology.

SUMMARY OF THE INVENTION

One object of the present invention is to provide an enterprise communication system that utilizes an existing digital mobile communications network such as the GSM network to securely implement, access, use, and manage enterprise-specific resources, particularly enterprise applications and business rules/processes, by means of security/trust token-enabled wireless communication devices.

Another object of the present invention is to provide an enterprise-specific identity module based upon conventional smart cards, which is configured to enable the secure implementation and management of enterprise-specific enterprise applications and business rules/processes, for the wireless communication devices used in the enterprise communication system according to the present invention.

These and other objects are achieved by an enterprise communications system according to the present invention for securely implementing, accessing, using, and managing enterprise-specific resources that comprises one or more Mandate clients, each Mandate client including a wireless communication device and an enterprise-specific identity module installed in such wireless communication device, a digital mobile communications network operative to provide a wireless communications link to each Mandate client, and a Mandate server interfaced with the digital mobile communications network and interconnected to the enterprise-specific resources, each enterprise-specific identity module having stored therein a unique authentication key and cryptographic algorithms, the unique authentication key and the cryptographic algorithms of the enterprise-specific identity module being available to the digital mobile communications network and the Mandate server, wherein each Mandate client, the digital mobile communications network and the Mandate server of the enterprise communications system utilize the unique authentication key and the cryptographic algorithms to provide authenticated and encrypted communications therebetween for secure implementation, access, use, and management of enterprise-specific resources by each Mandate client.

BRIEF DESCRIPTION OF THE DRAWINGS

These and other objects, features, and advantages of the present invention will be apparent from the following detailed description of preferred embodiments of the present invention when considered in conjunction with the accompanying drawings wherein.

DETAILED DESCRIPTION OF PREFERRED EMBODIMENTS

Figure 2:
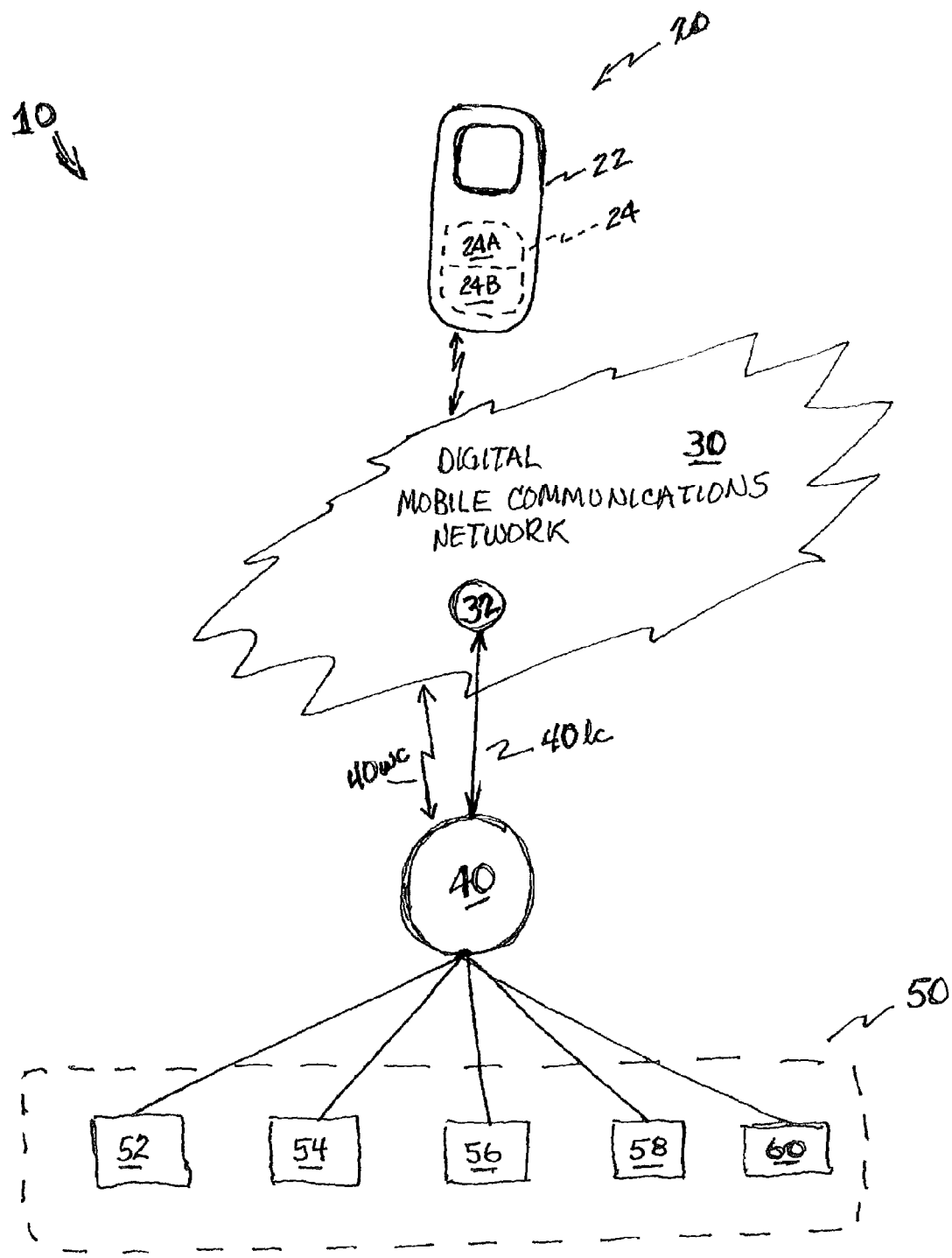
FIG. 2 depicts one preferred embodiment of an enterprise communications system according to the present invention for securely managing, accessing, using, and managing enterprise-specific resources.

Referring now to the drawings wherein like reference numerals indicate corresponding or similar elements throughout the several views, FIG. 2 depicts one preferred embodiment of an enterprise communications system 10 according to the present invention for securely implementing, accessing, using, and managing enterprise-specific resources, i.e., enterprise-specific applications and business rules/processes, via an existing digital mobile communications network, utilizing security/trust token-enabled wireless communication devices. The enterprise communications system 10 according to the present invention provides end-to-end secure channels of communication between mobile enterprise users possessing enterprise-specific security/trust token-enabled wireless communication devices and enterprise-specific applications and business rules/processes, provides an enterprise-specific authentication and authorization scheme, provides enterprise-specific action menus that reflect enterprise business rules/policies and context-sensitive options for alternative courses of action, and the implementation of enterprise-specific applications. The enterprise communications system 10 comprises one or more Mandate clients 20 (Mandate is used herein in a trademark context to identify specially-configured elements comprising the present invention), a digital mobile communications network 30, and an enterprise Mandate server 40, which is interconnected to one or more diverse enterprise resources 50 such as an enterprise 'solutions' database 52, i.e., enterprise-specific applications and business rules/processes, an enterprise data repository 54, a personal data repository 56, a third-party data repository 58, e.g., supplier specifications, and a browser 60. One skilled in the art will appreciate that other enterprise resources can be implemented via the enterprise communications system 10 according to the present invention, depending upon the particular characteristics of any specific enterprise.

The Mandate client 20 comprises a standard wireless communication device 22 of the type utilized by the digital mobile communications network 30, e.g., a GSM terminal where the digital mobile communications network 30 is a GSM network, with an enterprise-specific security/trust token 24 (for convenience of disclosure, this enterprise-specific security/trust token 24 will hereinafter be referred to as an EIM (Enterprise Identity Module 24) card) installed therein. As used herein, the EIM 24 is basically a smart card such as a SIM, UIM, R-UIM, or USIM of the type conventionally utilized in digital mobile communication networks that has been customized for usage by a particular enterprise in accordance with the teachings of the present invention.

The enterprise will manage the distribution of EIM cards 24 in much the same way that a digital mobile communications network operator controls the distribution of SIM cards. IEM cards 24 can be distributed to enterprise employees so that such employees can be in continual secure wireless communication with the enterprise for the receipt and transmission of enterprise-specific messages and/or data and conduct secure business transactions on behalf of the enterprise using enterprise-specific applications. EIM cards 24 can be distributed to enterprise customers so that such customers can conduct secure business transactions with the enterprise, e.g., product ordering. EIM cards 24 may also be distributed to preferred suppliers to facilitate management of enterprise inventory. EIM cards 24 may also be distributed to other parties that have a demonstrated need to access enterprise resources 50. For example, if the enterprise conducts R&D under federally funded sponsorship, Mandate clients 20 can be issued to the government R&D project managers so that such managers can readily access the enterprise data repository 54 for updates on the status of the R&D project. One of the unique and beneficial aspects of the EIM cards 24 according to the present invention is that the EIM cards 24 are compatible for installation in and use by conventional wireless communication devices such as the GSM terminal.

As noted above, the digital mobile communications network operator conventionally controls the content stored in the SIM cards and the distribution of SIM cards to network subscribers. Such control includes the allocation of individual subscriber IMSIs and MSISDNs, the issuance of individual subscriber authentication keys, and the specification of cryptographic algorithms for subscriber authentication and encryption of communications traffic. In accordance with the present invention, the enterprise and the operator of the digital mobile communications network 30 collaborate regarding the content of EIM cards 24 according to the present invention.

In one embodiment of the present invention, the enterprise specifies the security content of the EIM card 24. That is, the enterprise specifies or defines the cryptographic algorithms to be embedded in the EIM card 24, the protocol to be used for authentication, the authentication keys to be assigned to individual enterprise users, and the IMSIs to be assigned to individual enterprise users. Under this embodiment, the operator of the digital mobile communications network 30 can retain responsibility for assigning MSISDNs to individual enterprise users, although it may be preferable to reserve a block of consecutive MSISDNs for the exclusive use of the enterprise, which would then assign reserved MSISDNs to individual corporate users, i.e., individual enterprise users would be anonymous with respect to the digital mobile communications network 30. This enterprise-defined security content is stored in the EIM card 24 and available to the network-switching center 32 for implementation by the digital mobile communications network 30 when processing wireless communications involving any Mandate client 20.

In another embodiment of the present invention, the enterprise utilizes the existing security content typically provide by the operator of the digital mobile communications network 30. In this embodiment, accordingly, the operator of the digital mobile communications network 30 specifies or defines the cryptographic algorithms to be embedded in the EIM card 24, the protocol to be used for authentication, the authentication keys to be assigned to individual enterprise users, and the IMSIs and MSISDNs to be assigned to individual enterprise users. The enterprise secures the right to use such security content, e.g., by license agreement, as necessary in the Mandate server 40 to securely implement, access, use, and manage enterprise resources 50 via the operator's digital mobile communications network 30 utilizing Mandate clients 20. For example, so the enterprise can construct the "access" and "authorization" correspondence tables described below, or the enterprise can use these cryptographic algorithms and authentication keys so that communications can be forwarded from the network switching center 32 to the Mandate server 40 in an encrypted format and decrypted by the Mandate server 40 and vice versa.

The present invention contemplates that the EIM card 24 will include the data and application(s) typically stored on the conventional security/trust token for the digital mobile communications network 30 and will use the SIM Toolkit for interaction with enterprise users and for maintenance of EIM cards 24. For example, where the digital mobile communications network 30 is a GSM network utilizing a SIM card, the EIM card 24 will include the data and application(s) (see reference numeral 24A in FIG. 2) typically stored on the SIM card by the network operator—see discussion on SIM cards in the Background section. Accordingly, the Mandate client 20 according to the present invention will allow enterprise users to avail themselves of the conventional communication services provided by the digital mobile communications network 30.

In addition, the EIM card 24 of the present invention will include an enterprise-specific IT application and enterprise-specific menus tailored to the business processes, operating procedures, business transactions, mobile messaging, databases, training, and personnel of the enterprise (see reference numeral 24B in FIG. 2). These enterprise-specific IT application and menus enable enterprise-specific business operations and processes such as monitoring, messaging, managing, and tracking/auditing. Such monitoring, messaging, managing, and tracking/auditing functions can include, for example, 'Alert' messaging, e.g., pushing a message to Mandate clients 20 via the Mandate server 40, 'Workflow' messaging, e.g., message pushed to any Mandate client 20 by the Mandate server 40, response selected from an enterprise-specific menu and transmitted via tasked Mandate client 20 back to the Mandate server 40, 'Database Access' messaging, e.g., query composed on and transmitted by any Mandate client 20 to the Mandate server 40, response transmitted by the Mandate server 40 to tasking Mandate client 20, 'Standing Order' messaging, e.g., review and select a choice or choices from an enterprise-specific menu and transmit selection(s) via any Mandate client 20 to the Mandate server 40, and reception of tracking/confirmation number transmitted by the Mandate server 40 at the tasking Mandate client 20, 'Quotation' messaging, e.g., fill in enterprise-specific form and transmit to the Mandate server 40 via any Mandate client 20, receive tracking/confirmation number transmitted by the Mandate server 40 at the tasking Mandate client 20, and 'Contract' messaging, e.g., receive terms and conditions of contract at any Mandate client 20 from the Mandate server 40, indicate acceptance (or non acceptance) of contract and transmit to the Mandate server 40 via the tasked Mandate client 20. The foregoing list is intended to be illustrative of, and not exclusive of, enterprise-specific business operations and processes that can be implemented using the enterprise-specific IT application and menus stored on the EIM card 24 of the present invention. One skilled in the art will appreciate that, depending upon the nature of the enterprise and the business conducted thereby, other types of enterprise-specific business operations and processes can be implemented using the EIM card 24 according to the present invention.

The enterprise-specific IT application and menus stored in the EIM card 24 also permit a wide range of enterprise-specific applications to be enabled via any Mandate client 20—Mandate server 40 connection. Representative examples of such enterprise-specific applications include accounting and finance applications, customer relationship management applications, field services support applications, human resources applications, inventory control applications, manufacturing applications, network management applications, procurement applications, sales force automation applications, and travel applications. One skilled in the art will appreciate that, depending upon the nature of the enterprise and the business conducted thereby, other types of enterprise-specific applications can be enabled using the EIM card 24 according to the present invention.

The enterprise-specific menus available through the EIM card 24 include event- sensitive, alternative-action menus that allow the Mandate client 20 to implement enterprise-specific business rules/policies in the context of a specific event. These event-sensitive, alternative-action menus provide the Mandate client 20 with a set of enterprise-approved alternative courses of action (in response to a specific event) through the Mandate client 20, i.e., the Mandate client 20 provides the ability to select in real-time an alternative course of action. By way of example, presume an enterprise employee in travel status has just been notified that the last leg of his/her flight itinerary has been canceled (the specific event). Enterprise travel policy recognizes that such an event may occur and provides for several alternative courses of action for such a stranded traveler as exemplarily follows: (1) reschedule to a later flight the same day; (2) reschedule to a different airline the same day; (3) overnight stay and reschedule flight for the next day; or (4) rent a vehicle if within 300 miles of final destination. These alternative courses of action would be provided to the enterprise traveler as an event-sensitive, alternative-action menu via the user interface of the Mandate client 20.

Regardless of the configuration specifics of the EIM card 24, the enterprise retains control of the distribution of the EIM cards to enterprise users. This allows the enterprise to retain a high degree of control over who has an EIM card 24, and concomitantly, access to and authorization to use enterprise resources 50, as well as knowledge regarding the immediate location of all distributed EIM cards 24 (if the Mandate client 20 is on or currently engaged in a communications session).

The digital mobile communications network 30 incorporated in the enterprise communications system 10 according to the present invention is an extant network such as the GSM network described above in the Background section. This allows an enterprise to leverage the existing assets and resources of such digital communications network 30 for its benefit, i.e., providing secure channels of communication between Mandate clients 20 and the Mandate server 40 (and concomitantly, the enterprise resources 50).

The Mandate server 40 is the enterprise server that functions as the communication and control hub or interface between individual Mandate clients 20 and the enterprise resources 50 of the type described above, which are intended to be representative, but not exclusive, of business applications and rules/processes for an enterprise. It is contemplated that communications between the Mandate server 40 and the enterprise solutions database 52 will be effected via application programming interfaces. Communications between the Mandate server 40 and the enterprise data repository 54, the enterprise personal data repository 56, the third party data repository 58, and the browser 60 can be implemented via any conventional means.

In one embodiment of the present invention for small-scale implementations, e.g., small businesses or corporations, the Mandate server 40 is physically and functionally configured to function as a Mandate client, i.e., includes an EIM card 24, such that the Mandate server 40 operates as a "virtual" Mandate client in the context of the digital mobile communications network 30. This embodiment facilitates direct wireless communications between individual Mandate clients 20 and the Mandate server 40 (see reference numeral 40wc in FIG. 2), i.e., providing wireless LAN access to enterprise resources 50, via the digital mobile communications network 30.

Figure 1:
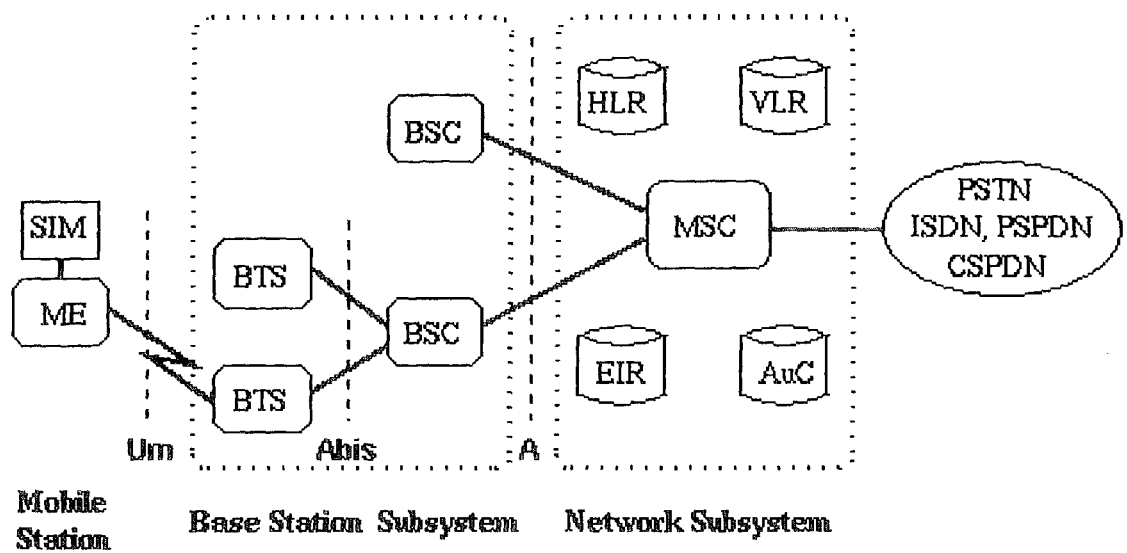
FIG. 1 illustrates the general architecture of a digital mobile communications network for use in accordance with the present invention, in this case a GSM network.

In another embodiment of the present invention for large-scale implementations, e.g., large corporations, the Mandate server 40 is an enterprise device that is physically and functionally connected to the network switching center 32 of the digital mobile communications network 30 via a high-speed dedicated or network landline 40lc, e.g., T-1 or T-3, or PSTN, ISDN, PSPDN, and/or CSPDN, respectively. For example, if the secure digital communications network 30 used in the enterprise communications network 10 according to the present invention is a GSM network, the Mandate server 40 can connect to the MSC of the GSM network subsystem (see FIG. 1) using an existing network landline 40lc, e.g., PSTN, ISDN, PSPDN, and/or CSPDN, that is already intergrated into the secure digital communications network 30.

In yet a further embodiment according to the present invention the communications and control functions of the Mandate server 40 can be implemented via the server used by the digital mobile communications network 30. That is, a server used in the network subsystem of the digital mobile communications network 30, e.g., a server in the MSC of the GSM network, is partitioned and programmed to provide the functions of the Mandate server 40 according to the present invention as described herein for a specific enterprise, i.e., the network server is providing centrex services to the enterprise. Combinations of the above-described embodiments are also contemplated in implementing the secure enterprise communication system 10 according to the present invention.

At the functional level, the Mandate server 40 provides the authentication and authorization gateway between the EIM card 24 of individual Mandate clients 20 and the enterprise resources 50. The Mandate server 40 can maintain correspondence tables for issued EIM cards 24 to control access to and use of enterprise resources 50 via individual Mandate clients 20. For example, an "access" correspondence table comprising a listing of enterprise users, i.e., individuals to whom an EIM card 24 has been issued, and the corresponding IMSI, MSISDN, and authentication key for each such enterprise user, can be stored and used by the Mandate server 40 to control access to the Mandate server 40 by means of an authentication protocol. Another correspondence table, an "authorization" correspondence table, comprises a listing of individual enterprise users (e.g., by name and/or IMSI), a listing of the enterprise resources 50 that each individual user is authorized access to, and what privileges each individual enterprise user has with respect to those enterprise resources 50 for which access is authorized, e.g., read only, read and write, download to the Mandate client 20, perform transactions on behalf of the enterprise, etc. Such enterprise authorizations would be based upon individual EIM cards 24.

The Mandate server 40 is also operative to encrypt and decrypt communications between itself and individual Mandate clients 20, which includes any communications leg between the Mandate server 40 and the digital mobile communications network 30 over network landlines. Such encryption and decryption is based upon the authentication key and encryption algorithms stored in the EIM card 24, which are also stored by the Mandate server 40. The Mandate server 40 can also be operative to provide a diverse array of administrative functions that are a concomitant of effectively managing a secure communications network. Representative examples of such functions include monitoring and recording usage by individual Mandate clients 20, monitoring and reporting access to the Mandate server 40, including flagging and immediate reporting of any attempts at unauthorized access, particularly to sensitive/critical business resources, tracking and recording each enterprise-specific application and business rule/process accessed by individual Mandate clients 20, and recording lost or stolen EIM cards 24. One skilled in the art will appreciate that the Mandate server 40 according to the present invention can provide other functions, depending upon the particularities of any specific enterprise.

The browser 60 provides the means for a Mandate client 20 user to administer and personalize the parameters of the enterprise IT application available through the EIM card 24. For example, each Mandate client 20 user can utilize the browser 60 to store and dynamically manage in the EIM card 24 preferences and data, e.g., contacts, schedules, relevant to the user. The user can also use the browser 60 to store and dynamically manage those enterprise-specific business rules/processes, which transform real-time events into contingency action menus, relevant to the user in the EIM card 24. The enterprise can also use the browser 60 to store and dynamically manage pertinent profiles of particular enterprise employees, e.g., positions, responsibilities, authorization levels, in the EIM card 24. The browser 60 can be a special-purpose, specially-designed Wireless Internet Browser (WIB) for exclusive use with the EIM card 24 or can be a standard WIB.

A variety of modifications and variations of the secure enterprise communication system according to the present invention, as described above, are possible. It is therefore to be understood that, within the scope of the claims appended hereto, the present invention may be practiced other than as expressly described herein.

What is claimed is:

1. An enterprise communication system for securely implementing, accessing, using, and managing enterprise-specific resources, comprising:

one or more clients, each client including a wireless communication device and an enterprise-specific identity module installed in such wireless communication device, each enterprise-specific identity module having stored therein a unique authentication key and cryptographic algorithms and at least one enterprise-specific IT application and enterprise-specific menu operable to enable a user to use the enterprise-specific IT application;

a digital mobile communications network operative to provide a wireless communications link to each client; and an enterprise server interfaced with the digital mobile communications network and interconnected to the enterprise-specific resources;

the authentication key and the cryptographic algorithms of each enterprise-specific identity module being available to the digital mobile communications network and the enterprise server;

wherein each client, the network and the enterprise server utilize the authentication key and the cryptographic algorithms to provide authenticated and encrypted communications therebetween for secure implementation, access, use, and management of enterprise-specific resources, including the enterprise-specific IT application and menu, by each client.

2. The enterprise communications system of claim 1 wherein the enterprise-specific menus include event-sensitive, alternative-action menus.

3. The enterprise communications system of claim 1 wherein the unique authentication key and the cryptographic algorithms stored in each enterprise-specific identity module are based upon enterprise specifications.

4. The enterprise communications system of claim 1 wherein the enterprise server is interfaced with the digital mobile communications network by means of a landline network.

5. The enterprise communications system of claim 1 wherein the enterprise server is configured as a virtual client that interfaces with the digital mobile communications network via a radio link.

6. The enterprise communications system of claim 1 wherein the digital mobile communications network includes a communications network server, and the enterprise server comprises a partitioned and programmed part of the communications network server that interfaces with the network via internal hard-wired channels.

7. The enterprise communications system of claim 1 wherein the digital mobile communications network is the GSM network.

8. An enterprise communication system for securely implementing, accessing, using, and managing enterprise-specific resources, comprising:

one or more clients, each client including a wireless communication device and an enterprise-specific identity module installed in such wireless communication device, each enterprise-specific identity module having stored therein a unique authentication key and cryptographic algorithms, and at least one enterprise-specific IT application and enterprise-specific menu operable to enable a user to use the enterprise-specific IT application;

a digital mobile communications network operative to provide a wireless communications link to each client; and a server interconnected to the digital mobile communications network via a landline network and interconnected to the enterprise-specific resources;

the authentication key and the cryptographic algorithms of each enterprise-specific identity module being available to the digital mobile communications network and the server;

wherein each client, the digital mobile communications network and the server utilize the authentication key and the cryptographic algorithms to provide authenticated and encrypted communications therebetween for secure implementation, access, use, and management of enterprise-specific resources by each client, including access to enterprise-specific IT applications and menus.

9. The enterprise communications system of claim 8 wherein the enterprise-specific menus include event-sensitive, alternative-action menus.

10. The enterprise communications system of claim 8 wherein the unique authentication key and the cryptographic algorithms stored in each enterprise-specific identity module are based upon enterprise specifications.

11. The enterprise communications system of claim 8 wherein the digital mobile communications network is the GSM network.

12. A method for securely implementing, accessing, using, and managing enterprise-specific resources via an enterprise communications system, comprising the steps of:

providing one or more clients wherein each client includes a wireless communication device and an enterprise-specific identity module installed in such wireless communication device, each enterprise-specific identity module having stored therein a unique authentication key and cryptographic algorithms, and at least one enterprise-specific IT application and enterprise-specific menu operable to enable a user to use the enterprise-specific IT application;

providing a digital mobile communications network operable to provide a wireless communications link to each client;

providing a server operable to interface with the digital mobile communications network and the enterprise-specific resources;

making the unique authentication key and the cryptographic algorithms of each enterprise-specific identity module available to the digital mobile communications network and the server; and utilizing the unique authentication key and the cryptographic algorithms to provide authenticated and encrypted communications between each client, the digital mobile communications network, and the server so that each client can securely implement, access, use, and manage the enterprise-specific resources, including enterprise-specific IT applications and menus.

* * * * *